No. 883,118. PATENTED MAR. 24, 1908.
H. McC. NORRIS.
ARM FOR RADIAL DRILLS.
APPLICATION FILED OCT. 29, 1907.

UNITED STATES PATENT OFFICE.

HENRY McCOY NORRIS, OF CINCINNATI, OHIO, ASSIGNOR TO THE BICKFORD DRILL & TOOL COMPANY, OF CINCINNATI, OHIO, A CORPORATION.

ARM FOR RADIAL DRILLS.

No. 883,118.  Specification of Letters Patent.  Patented March 24, 1908.

Application filed October 29, 1907. Serial No. 399,750.

*To all whom it may concern:*

Be it known that I, HENRY McCOY NORRIS, a citizen of the United States, residing at Cincinnati, in the county of Hamilton and State of Ohio, have invented certain new and useful Improvements in Arms for Radial Drills, of which the following is a specification.

My invention relates to an improvement in an arm of a radial drill.

The object of my invention is to provide an improved structure of arm for radial drills which will greatly increase its strength and rigidity, and which will provide greater bearing surface against which the head-stock can be locked.

The features of my invention are more fully set forth in the description of the accompanying drawings, forming a part of this specification, in which:—

Figure 1:
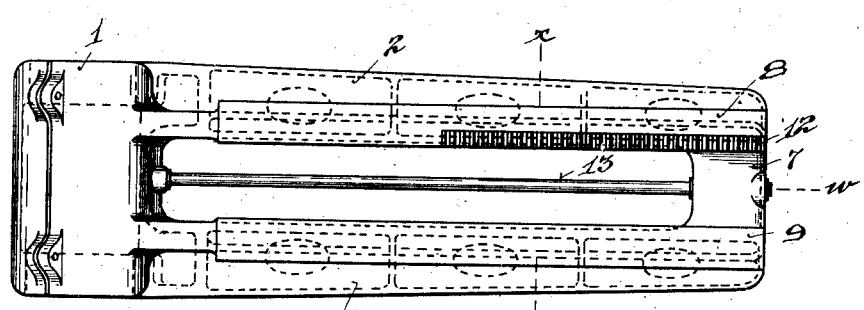
Figures 2, 3:
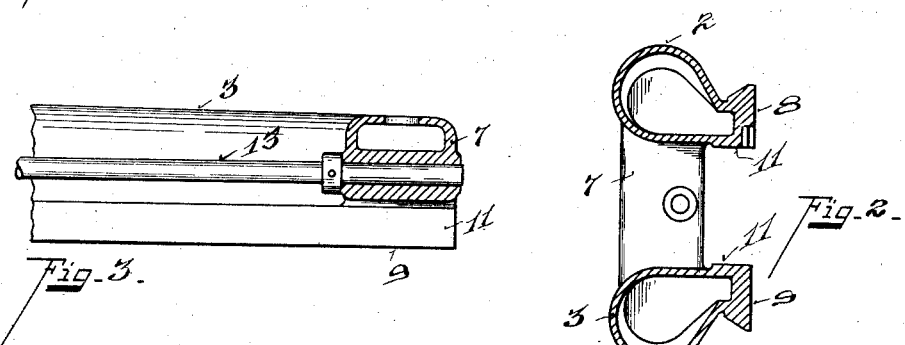
Figure 4:
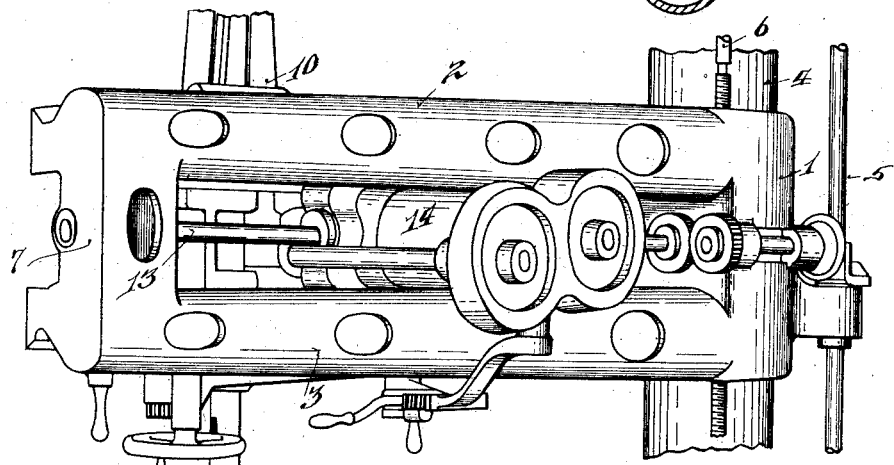

Figure 1 is a front elevation of my improved arm for radial drills. Fig. 2 is an enlarged section on line $x$—$x$, Fig. 1. Fig. 3 is an enlarged section on line $w$, Fig. 1. Fig. 4 is a perspective view of the rear portion of the arm showing the head-stock and transmission elements in position.

As shown, the arm is constructed for use on what is termed a half universal radial drill, but it is obvious that an arm can be constructed for a plane or full universal radial drill without departing from the essential features of my invention.

The essential feature of my invention consists in constructing an arm for a radial drill of two tubular sections joined together at each end. This enables the main driving shaft and transmission elements to occupy a position between the tubular sections, whereby the same can be journaled in rigid bearings at each end of the arm, and in convenient position regarding compactness and neatness of design.

1 represents the sleeve from which the tubular sections 2, 3, project. Said sleeve is split in the usual manner and fits the column 4, to which it is clamped in the usual manner. The column carries the main driving shaft 5 and the screw feed shaft 6 in the usual manner. The arms 2, 3, terminate at the outer end in a connecting tube 7, formed integral therewith. The forward or front face of each tube section of the arm is provided with gib-ways 8, 9, upon which the head-stock 10 is slidably mounted. The inner opposing faces of the tube sections 2, 3, are provided with the ways 11 forming clamping surfaces between and against which the head-stock 10 is clamped in its adjusted position.

12 represents a rack formed on the gib-way 8 for feeding the head-stock 10.

13 represents a shaft journaled in the arm and between the tube-sections 2, 3.

14 represents a casing mounted between the tubular sections 2, 3, within which is journaled a system of variable speed gearing for imparting a varying speed drive to the drill spindle.

By constructing an arm, as above described, it is capable of withstanding a greater drilling strain without flexing than is possible with the arms as heretofore constructed, and further it is also possible to more securely lock the head-stock in position. This enables the drill to be fed more rapidly into the work in making heavier cuts, and insures greater precision in action.

Having described my invention, I claim:—

An arm for radial drills, comprising two tubular sections parallel with each other, integrally connected at each end, a head-stock gibbed to said tubular sections, and having a bearing projection extended between said tubular sections, and ways formed on the inner opposing faces of the tube sections, providing rigid abutments between and against which the head may be clamped, substantially as described.

In testimony whereof I have hereunto set my hand.

HENRY McCOY NORRIS.

Witnesses:
 OLIVER B. KAISER,
 LEO O'DONNELL.